United States Patent
Matsuda

(10) Patent No.: US 7,058,897 B2
(45) Date of Patent: Jun. 6, 2006

(54) INFORMATION PROCESSING APPARATUS, INFORMATION PROCESSING METHOD, SERVICE PROVIDING SYSTEM, AND COMPUTER PROGRAM THEREOF

(75) Inventor: Satoru Matsuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 522 days.

(21) Appl. No.: 09/923,624

(22) Filed: Aug. 7, 2001

(65) Prior Publication Data

US 2002/0054094 A1    May 9, 2002

(30) Foreign Application Priority Data

Aug. 7, 2000    (JP)    ............................ P2000-238442

(51) Int. Cl.
G06F 3/00    (2006.01)

(52) U.S. Cl. ...................... 715/758; 715/753; 715/757; 715/769

(58) Field of Classification Search ................ 345/751, 345/752, 753, 755, 756, 757, 758, 759; 715/751, 715/752, 753, 755, 757, 758, 759, 754, 756; 709/204
See application file for complete search history.

(56) References Cited

U.S. PATENT DOCUMENTS

| | | | | |
|---|---|---|---|---|
| 5,796,395 A | * | 8/1998 | de Hond | 715/751 |
| 5,956,038 A | * | 9/1999 | Rekimoto | 345/419 |
| 5,999,208 A | * | 12/1999 | McNerney et al. | 348/14.08 |
| 6,112,186 A | * | 8/2000 | Bergh et al. | 705/10 |
| 6,400,381 B1 | * | 6/2002 | Barrett et al. | 345/758 |
| 6,480,885 B1 | * | 11/2002 | Olivier | 709/207 |
| 6,559,863 B1 | * | 5/2003 | Megiddo | 715/753 |
| 6,571,234 B1 | * | 5/2003 | Knight et al. | 707/3 |
| 6,581,096 B1 | * | 6/2003 | Cottrille et al. | 709/223 |
| 6,772,195 B1 | * | 8/2004 | Hatlelid et al. | 709/204 |
| 2003/0093474 A1 | * | 5/2003 | Kakuta et al. | 709/204 |
| 2003/0158897 A1 | * | 8/2003 | Ben-Natan et al. | 709/204 |

* cited by examiner

*Primary Examiner*—Ba Huynh
(74) *Attorney, Agent, or Firm*—Bell, Boyd & Lloyd LLC

(57) ABSTRACT

An invention allowing the exchange of community cards within a virtual space by an easy operation. A display screen shown on the display section of the user terminal device is composed of a virtual space display for displaying three-dimensional objects in a virtual space, and a list window of belongings displayed by the user's own community cards. The user can move freely within the virtual space while referring to the virtual space display, and when conversing with other users within the virtual space and the user wants to let another user participate in the community the user himself belongs to, the user can present community cards corresponding to the avatar, to a user for newly participating in the community, by drag-and-drop of any of the community cards on the avatar.

21 Claims, 9 Drawing Sheets

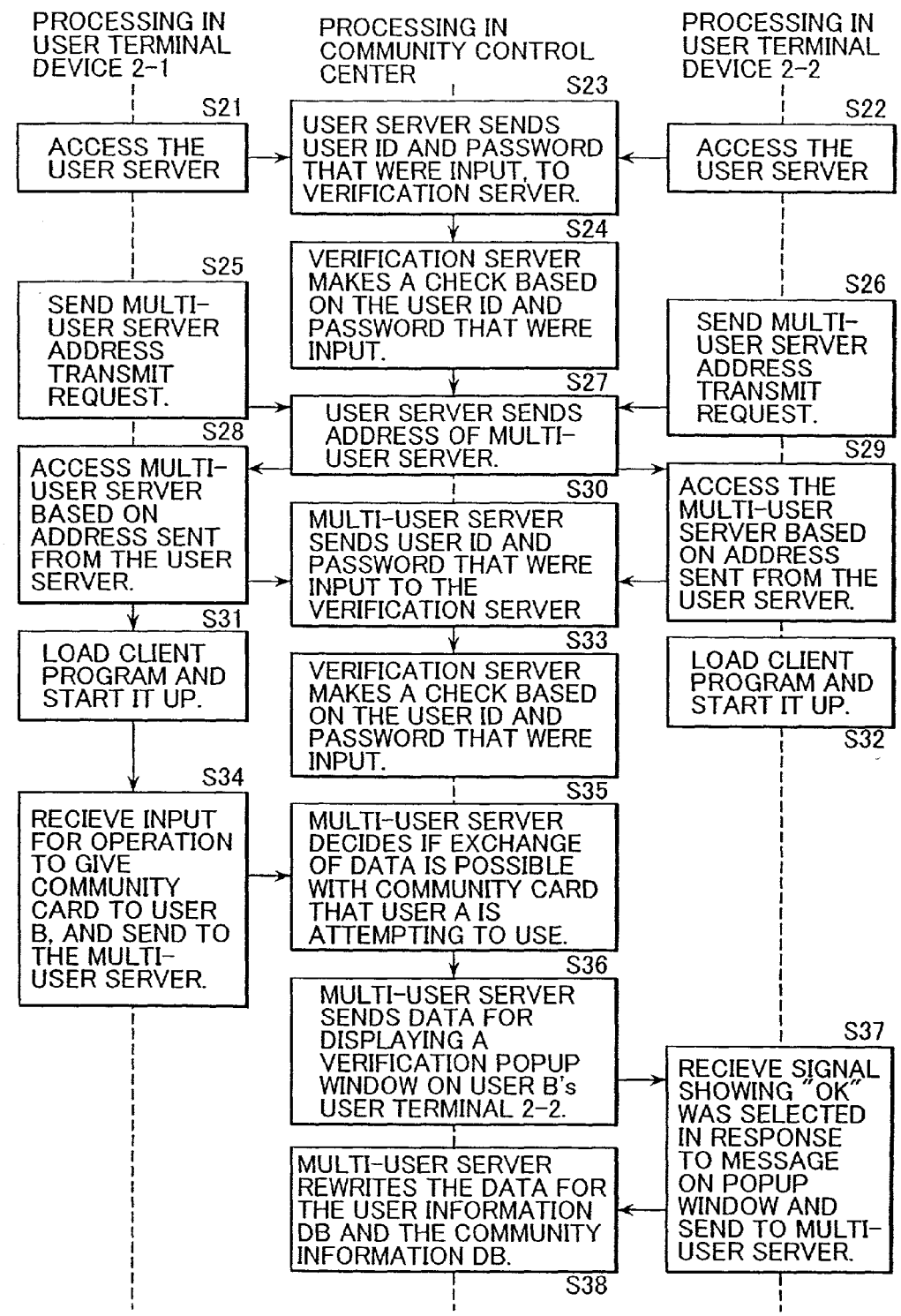

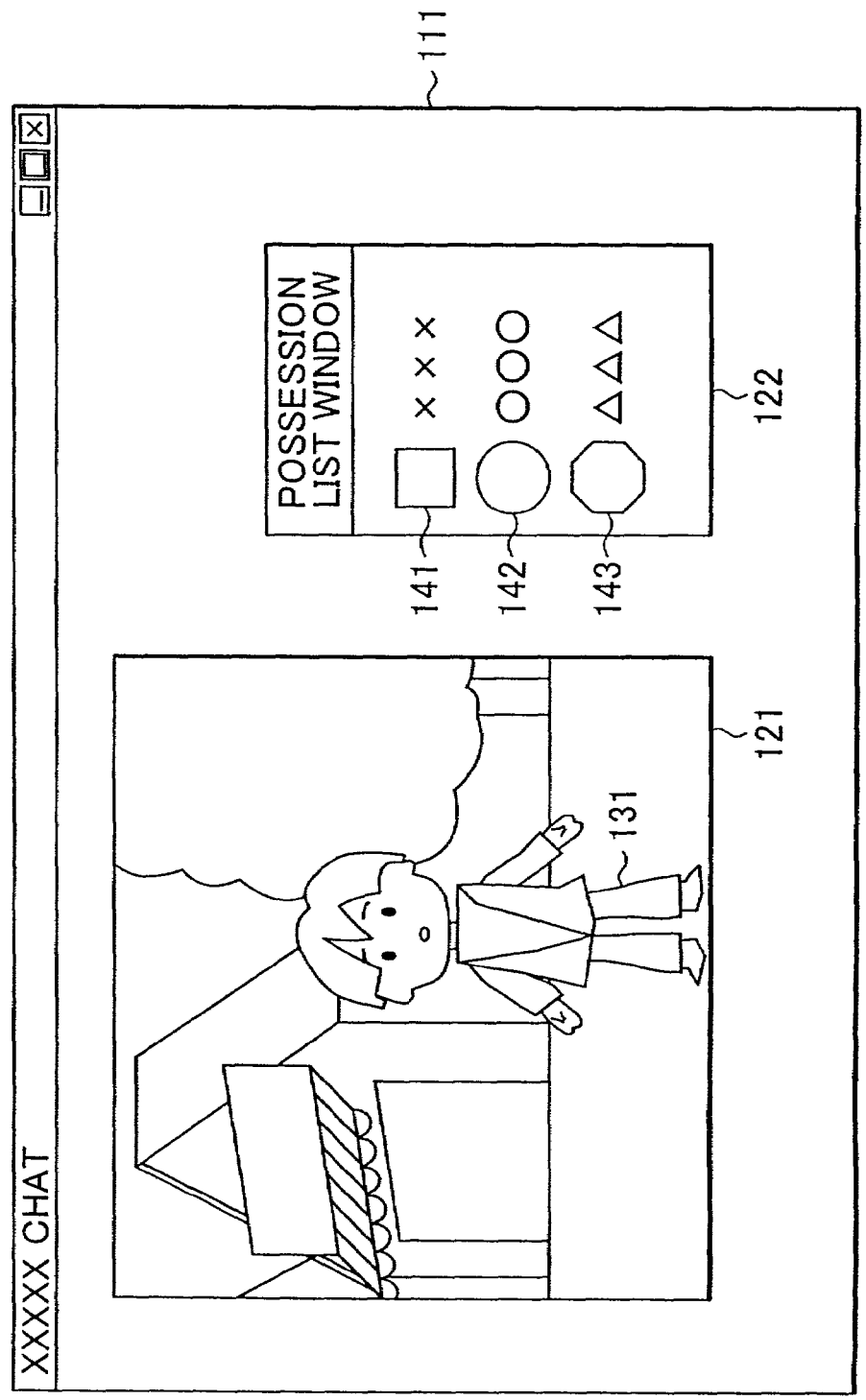

INFORMATION PROCESSING APPARATUS, INFORMATION PROCESSING METHOD, SERVICE PROVIDING SYSTEM, AND COMPUTER PROGRAM THEREOF

BACKGROUND OF THE INVENTION

The present invention relates to an information processing apparatus, information processing method, service providing system and a computer program, and relates in particular to an information processing apparatus, information processing method, service providing system and a computer program to allow participation in a user community within a virtual space by a simple operation.

Along with the rapid growth of the Internet in recent years, users are finding online companions having the same hobby or objectives and exchanging information, etc. So-called community services are therefore thriving. In order to utilize such services, the user registers for example, his own user profile, interests, hobbies and photographs on a dedicated registration menu opened as web content on the Internet. The registered user can utilize a variety of services and enjoy communication with others. Services for carrying out this communication are the provided for example as mailing lists, BBS (Bulletin Board System), chatrooms, group web services and areas for making personal home pages.

Virtual space is also being provided as a service for carrying out communication. Virtual space is described for example as a Virtual Reality Modeling Language (VRML) listing three-dimensional graphics data utilizing the World Wide Web framework on the Internet. Objects such as various shops and viewscapes, and one's own apparition (avatar) can be displayed in the virtual space by utilizing three-dimensional objects, etc. Avatars can carry out conversations with other avatars by conversations with printed characters (chat) or voices within the virtual space.

When the user becomes acquainted with members having the same interests or finds a community matching the user's own interests or hobbies, the user may participate in that community by becoming a member for example, by registering from a registration menu opened as web contents on the Internet or by making application to the community via a community controller (or manager) by utilizing electronic mail, etc.

When a user for example wants to invite another user he became acquainted with in the virtual space, to the community he participates in, or when a user is interested in a community of another user he met within the virtual space and wants to himself participate in that community, then, in order to join the new community the user must access the above described community registration menu, perform the registration tasks, and make application to participate by electronic mail, etc. In other words, the problem occurs that the user can not register in the community from within the virtual space.

SUMMARY OF THE INVENTION

In view of the above-described circumstances, the present invention has the object of allowing the user to participate in a user community by way of an easy operation within the virtual space.

The information processing apparatus of the present invention includes a first record controller that controls the recording of information relating to a community composed of a group of users. A second record controller controls the recording of information relating to the group of users. A first information generator generates a first set of information corresponding to a virtual space capable of being utilized by the group of users using the other information processing apparatuses. The information processing apparatus further includes a second information generator that generates a second set of information corresponding to an information list showing the community that a first user participates in. The information list is compiled from information relating to the group of users, and recording of the second set of information is controlled by the second information generator. A first output controller controls the output of the first set of information generated from the first information generator and the second set of information generated by the second information generator to the other information processing apparatuses. An input controller controls the input of a fourth set of information from the other information processing apparatuses. The fourth set of information shows the operation by a first user for giving a third set of information to a second user. The third set of information shows a specified community to the second user, from among a second set of information generated by the second information generator, within the virtual space generated by the first generation means. The first record controller controls the recording of information relating to the community shown by the third set of information, based on the fourth set of information with inputs controlled by the input controller, and the second record controller controls the recording of information relating to the first user and the second user, based on the fourth set of information with inputs controlled by the input controller.

In the virtual space, when a first user has given a third set of information to a second user, the first user and the second user can both become community members shown in the third set of information.

When the third set of information shows that the first user is a community controller, the first user gives the third set of information to the second user and the third set of information is information capable of showing the community members in the virtual space.

When the first user has given the third set of information to the second user in the virtual space, the first user loses the third set of information, and is no longer a community member shown in the third set of information, and the second user receives the third set of information and can become a community member shown in the third set of information.

The information processing apparatus can further include a third information generator that generates for each user, a fifth set of information corresponding to an exclusive user virtual space which can be utilized by the user; and a second output controller controlling the output of the fifth set of information generated by the third information generator, to the other information processing apparatuses. The fifth set of information generated by the third information generator can contain the second set of information.

The second set of information of the information processing apparatus is image information corresponding to the community, and on other information processing apparatuses can be displayed within the exclusive user virtual space output by the second output controller.

In the information processing apparatus, the size of the image information changes according to the number of members participating in the corresponding community.

In the information processing apparatus, when the user is the owner of the specified community, the image information corresponding to the specified community can be displayed separately for distinguishing between image information corresponding to other communities.

An information processing method for an information processing apparatus for exchanging information with other information processing apparatuses over a network, includes the followings steps. A first recording control step controls the recording of information relating to a community composed of a group of users, and a second recording control step controls the recording of information relating to the group of users. A first set of information corresponding to a virtual space utilizable by a group of users using other information processing apparatuses is generated in a first generation step. A second generation step generates a second set of information corresponding to information on a table showing the community participated in by the first user, from information relating to a plurality of users whose recording is controlled by the processing in the second recording control step. The method further includes an output control step for controlling the output to other information processing apparatuses, of the first set of information generated by processing in the first generation step, and the second set of information generated by processing in the second generation step. Conversely, an input control step controls the input from other information processing apparatuses, of a fourth set of information showing the operation by a first user for giving the third set of information showing a specified community to a second user, from among the second set of information generated in the second generation step, within the virtual space generated by the processing in the first generation step. The first recording control step controls the recording of information relating to the community shown by the third set of information, based on the fourth set of information with inputs controlled by the processing in the input control step, and the second recording control step controls the recording of information relating to the first user and the second user, based on the fourth set of information with inputs controlled by the processing in the input control step.

An information processing computer program according to the present invention performs the following steps. A first recording control step for controlling the recording of information relating to a community composed of a group of users is accomplished in a first recording control step. A second recording control step controls the recording of information relating to a group of users. First and second generation steps generate a first set of information corresponding to a virtual space utilizable by a group of users using other information processing apparatuses, and a second set of information corresponding to information on a table showing the community participated in by a first user, from information relating to a plurality of users whose recording is controlled by the processing in the second recording control step, respectively. An output control step controls the output to other information processing apparatuses, of the first set of information generated by processing in the first generation step, and the second set of information generated by processing in the second generation step. An input control step for controls the input from other information processing apparatuses, of a fourth set of information showing the operation by a first user for giving a third set of information showing a specified community to a second user, from among the second set of information generated by the second generation means, within the virtual space generated by the processing in the first generation step. The first recording control step controls the recording of information relating to the community shown by the third set of information, based on the fourth set of information with inputs controlled by the input controller, and the second recording control step controls the recording of information relating to the first user and the second user, based on the fourth set of information with inputs controlled by the processing in the input control step.

The service providing system of the present invention comprises a first information processing apparatus for exchanging information with other information processing apparatuses over a network. A second information processing apparatus is possessed by a user. The first information processing apparatus includes: a first record controller that controls the recording of information relating to a community composed of a group of users. A second record controller controls the recording of information relating to a number of different users. The first information processing apparatus further includes a first information generator that generates a first set of information corresponding to a virtual space capable of being utilized by a group of users all using other information processing apparatuses, and a second information generator that generates a second set of information corresponding to an information list showing the community that a first user participates in, from information relating to the group of users with recording controlled by the second information generator.

A first output controller controls the output of the first set of information generated from the first information generator and the second set of information generated by the second information generator to the second information processing apparatus. Similarly, a first input controller controls the input of a fourth set of information showing the operation by the first user for giving a third set of information showing a specified community to a second user, from among a second set of information generated by the second information generator, within the virtual space generated by the first information generator from the second information processing apparatus. The first record controller controls the recording of information relating to the community shown by the third set of information, based on the fourth set of information with inputs controlled by the first input controller and the second record controller controls the recording of information relating to the first user and the second user, based on the fourth set of information with inputs controlled by the first input controller.

The second information processing apparatus includes a second input controller that controls the input of the first set of information and the second set of information. Outputs are controlled by the first output controller. A display controller controls the display of the first set of information and the second set of information, with outputs controlled by the second input controller. A third input controller controls the input of the fourth set of information showing the operation for supplying to the second user the third set of information showing a specified community from among the second set of information within the virtual space showing the first set of information, and the third set of information which is supplied by the first user after referring to the first set of information and the second set of information whose display is controlled by the display controller. A second output controller controls the output of the fourth set of information to the first information processing apparatuses, with inputs controlled by the third input controller.

In each of the information processing apparatuses, the information processing method and the computer program for controlling the recording of information relating to a community composed of a group of users, and recording of information relating to the plurality of users of the present invention, a first set of information is generated corresponding to a virtual space capable of being utilized by a number of different users using the other information processing apparatuses. A second set of information is generated corresponding to an information list showing the community a first user participates in. A fourth set of information is generated showing the operation by a first user for giving the third set of information showing a specified community to a second user, from among the second set of information, within the virtual space, and inputs from other information processing apparatuses are controlled. The recording of information relating to the community shown by the third set of information is controlled based on the fourth set of information, and the recording of information relating to the first user and the second user is also controlled based on the fourth set of information.

The service providing system of the present invention includes a first information processing apparatus for exchanging information with other information processing apparatuses over a network, and a second information processing apparatus possessed by the user.

The recording of information relating to a community composed of a group of users is controlled in the first information processing apparatus, as is the recording of information relating to a group of users. A first set of information is generated corresponding to a virtual space capable of being utilized by a plurality of users utilizing the second information processing apparatuses, and a second set of information is generated corresponding to an information list from among the plurality of users showing the community a first user participates in. An output is controlled to the second information processing apparatus for the first set of information and the second set of information. Within the virtual space, a fourth set of information is generated showing the operation by a first user for giving a third set of information showing a specified community to a second user from among the second set of information. Inputs from the second information processing apparatuses are controlled within the virtual space. The recording of information relating to the community shown by the third set of information is controlled based on the fourth set of information, as is the recording of information relating to the first user and the second user.

The inputs of the first set of information and the second set of information are controlled in the second information processing apparatus. The display of the first set of information and the second set of information is also controlled in the second information processing apparatus. The input of the fourth set of information showing the operation by a first user while referring to the first set of information and the second set of information for giving the third set of information showing a specified community from among the second set of information, to a second user, within a virtual space showing the first set of information is also controlled, as is the output of the fourth set of information to the first information processing apparatus.

BRIEF DESCRIPTION OF THE FIGURES

FIG. 8 is a flow chart for describing the process for performing the transfer of community cards utilizing the virtual space.

FIG. 9 is a drawing for showing the operation for transferring the community cards for an avatar indicating another user in the virtual space.

DETAILED DESCRIPTION OF THE INVENTION

The embodiments of the present invention are hereafter described while referring to the accompanying drawings.

Figure 1:
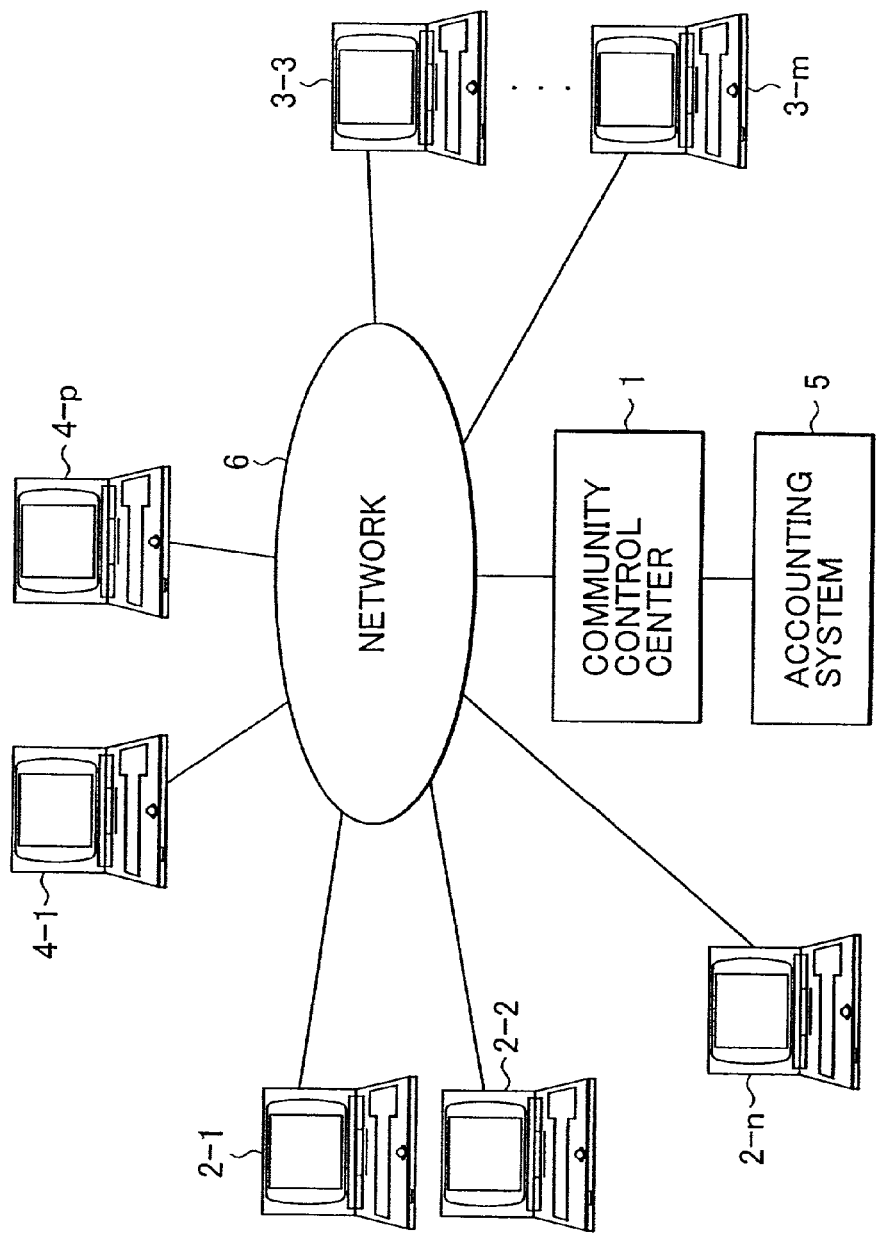
FIG. 1 is a drawing illustrating the network structure of the service providing the community system.

A drawing showing the network structure of a service (hereafter called, "the service") providing a community system according to the present invention is shown in FIG. 1.

User terminal devices 2-1 through 2-n are possessed or usable by a user. Company terminal devices 3-1 through 3-m are possessed by a company registered with the service. The distribution company terminal devices 4-1 through 4-p are possessed by a distribution company registered with the service are connected to a community control center 1 by way of a network 6 such as the Internet. The community control center 1 is also connected to an accounting system 5.

The user accesses the community control center 1 by using the user terminal devices 2-1 through 2-n, and can register with the service by implementing the registration process described later with reference to FIG. 6. Once the user has registered with the service, the user can participate in the community described with reference to FIG. 5, and can enjoy the services provided by the companies registered with the service.

The companies registered with the service can provide all manner of services to the user registered with the service by accessing the community control center 1 via the company terminal devices 3-1 through 3-m.

When a user registered with the service purchases products from a company registered with this service, a distribution company registered with the service can use a distribution company terminal devices 4-1 through 4-p to receive a product shipping request from a company by way of the community control center 1, and can then ship the product from the company to the user.

The community control center 1 sends accounting information related to using the service to an accounting system 5. In the example given here, the accounting system 5 is not connected to the network 6 and is only connected with the community control center 1. However, the accounting system 5 may also be connected to the community control center 1 over the network 6.

The accounting system 5 controls the payment of fees mutually generated by the provider of the service, the user registered with the service, and the company and the distribution company. The accounting system 5 monitors and manages the payments made separately or by a plurality of collaborating parties such as banks, credit companies, retail shops exchanging products as a substitute for money, or delivery operators, companies carrying out accounting system processing on the Internet (for example, pre-paid services, credit card number pre-registration method, or electronic credit method, etc.) convenience stores performing all types of accounting processing services on the Internet. The figure related here has only one accounting system 5, however, multiple accounting systems 5 may be provided, and the user may select an accounting system 5 for use.

Figure 2:
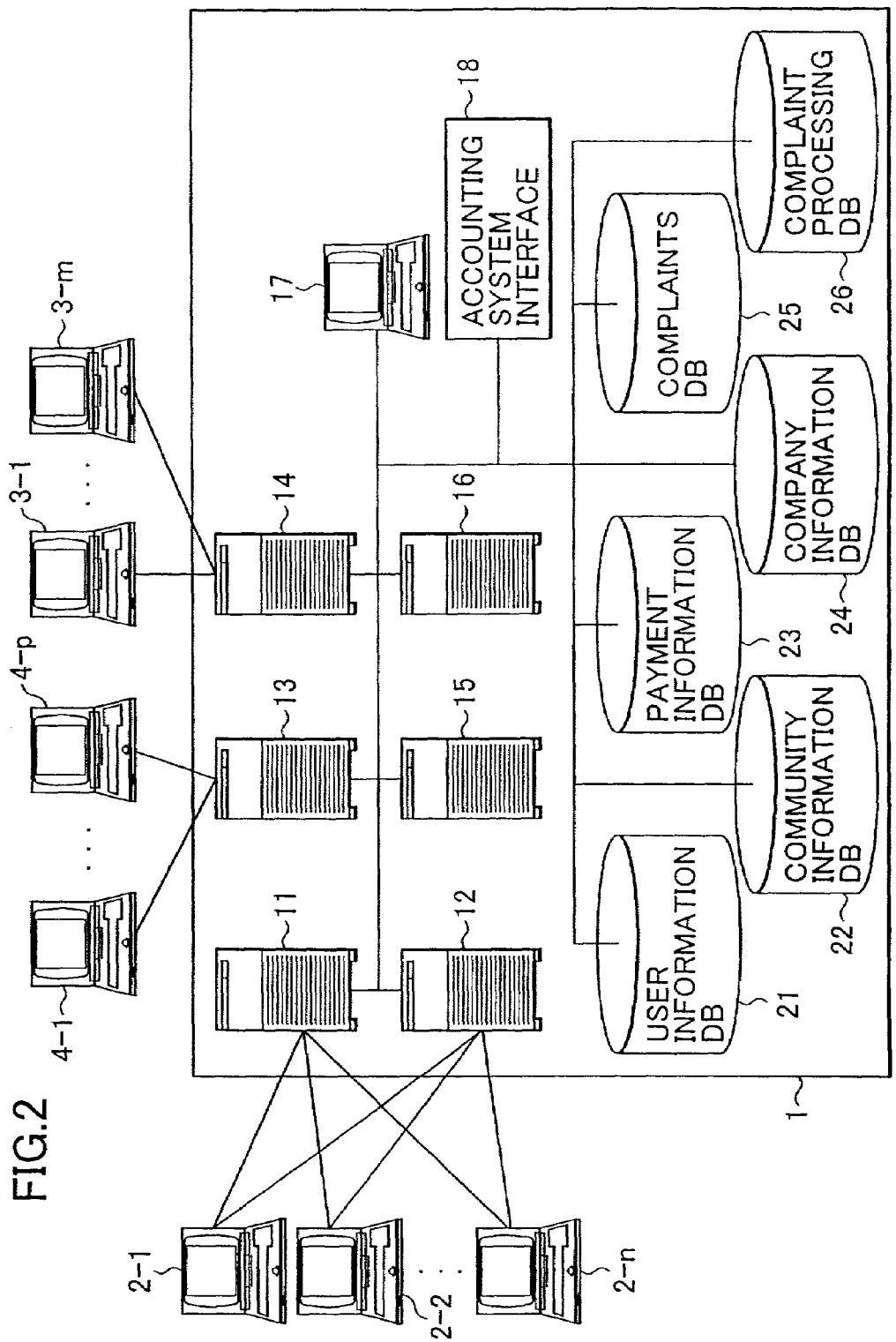
FIG. 2 is a drawing illustrating the structure of the community control system.

FIG. 2 illustrates the structure of the community control center 1 and the connections to the user terminal devices 2-1 through 2-n, the company terminal devices 3-1 through 3-m, and the distribution company terminal devices 4-1 through 4-p. In FIG. 2, the network 6 shown in FIG. 1, connecting to the user terminal devices 2-1 through 2-n, the company terminal devices 3-1 through 3-m, and the distribution company terminal devices 4-1 through 4-p is omitted from the drawing.

The community control center 1 provides a structure mutually connecting a user server 11, a multi-user server 12, a distribution company server 13, a company server 14, a verification server 14, a controller 16, a user information DB (data base) 21, a community information DB 22, a payment information DB 23, a company information DB 24, a complaints DB 25, a complaint processing DB 26, a system control terminal device 17, and an accounting system interface. The example here describes a structure where the community control center 1 is formed of a plurality of devices, however, the function of the community control center 1 may also be fulfilled by utilizing a single device.

The user server 11 connects with the user terminal devices 2-1 through 2-n by way of the network 6, and generates all types of web content for viewing by the user by utilizing the user terminal devices 2-1 through 2-n and discloses the web content on the network 6. The user server 11 implements processing for providing services such as new user registration, new registration a community, and for accepting participants in a community in compliance with signals input by way of the network 6 from the user terminal devices 2-1 through 2-n.

The multi-user server 12 connects with the user terminal devices 2-1 through 2-n by way of the network 6, and provides a "virtual space" for conversation (so-called chat) using text or voice on occasions when the user registered on the service has moved to an optional location and encountered another user. The multi-user server 12 also implements processing relating to a "room" described later on in the virtual space, granted to each registered user.

A language such as VRML relates the three-dimensional data utilizing the Internet WWW structure for the virtual space. Inside the virtual space, a variety of shops and landscapes, and an avatar representing oneself transformed to exist within the space can be displayed by utilizing three-dimensional objects, etc. Avatars can for example, converse with each other by voice or by conversation using letters (chat). The multi-user server 12 acquires information on the user's position within the virtual space and the contents of the dialog from the corresponding user from the user terminal device 2 over the network 6, and recreates the conversation and movement of the avatar present within the virtual space. The user accesses the multi-user server 12, participates in the virtual space, moves within the virtual space, speaks inside the virtual space, and exits from the virtual space by using the user terminal device 2.

A distribution company server 13 connects to the distribution company terminal devices 4-1 through 4-p for the transfer of information by way of the network 6. A company server 14 connects to the company terminal devices 3-1 for the transfer of information through 3-m also by way of the network 6.

When the user terminal devices 2-1 through 2-n connect with the user server 11 or the multi-user server 12, when the distribution company terminal devices 4-1 through 4-p connect with the distribution company server 13, or when the company terminal devices 3-1 through 3-m connect with the company server 14, the verification server 15 implements verification (or check) processing. When the user terminal devices 2-1 through distribution company terminal devices 4-p have accessed the corresponding server from among user server 11 through company server 14, an ID (identity) and a password for example, are input to the user server 11 through company server 14 by way of the network 6. The verification server 15 accepts the ID and the password entry from the user server 11 through company server 14, and for example searches in the user information DB 21 or the company information DB 24 for the ID and password that were entered, decides if the access request is from a correct user, company, or distribution company or not, and outputs the decision result to the server corresponding to the user server 11 through company server 14.

A controller 16 controls access rights to the user information DB 21 through complaint processing DB 26 for user server 11 through verification server 15, records accounting processing and data required for accounting processing of the service, and sends the accounting processing information to the accounting system 5 by way of the accounting system interface 18.

Information on the user registered in the service is stored in the user information DB 21. During registration in the service, the attributes of each user, such as the user ID, full name, age, address, electronic mail address, types of hobbies, keywords relating to that user (such as hobbies) are first of all stored in the user information DB 21. Afterwards, when the user has participated in a community, the community the user participated in is stored in the user DB21, and when the user quits the community, the registered community is deleted.

Information on the community is stored in the community information DB 22. Information such as the community name, object of the community's interest, number of members, average member age, member age distribution, ratio of male to female members, list of members, names of owners managing the community, rankings of member individual keywords (ranking for specified hierarchy of keywords shared by the members), as well as keywords expressing the community (plurality of words are allowed) are stored in the community information DB 22. When a user, for example, has applied to purchase a product of a company, the company does not know individual information about the user. However, a profile of the user purchasing the product can be provided by means of the user individual keyword ranking. When a change occurs in the members that constitute the community, the corresponding information in the community information DB 22 can be rewritten.

Information relating to data on payment of fees occurring from use of the service is stored in the payment information DB 23. Information such as the fee paid by the user or the ID of the company, details on the utilization fee, date of payment as well as the method of payment are registered in the payment information DB 23. Information relating to companies and distribution companies registered with the service are stored in the company information DB 24. Information such as the company name or distribution company name, company ID or distribution company ID, address, electronic mail address, and details on the service are stored within the company information DB 24.

Information relating to a complaint coming from the user registered in the service, the company, or the distribution company is stored in the complaint DB 25. Information such as the number attached to the corresponding complaint, the ID of the company, or distribution company or user bringing the complaint, details on the complaint and the date of registration are also stored in the complaint DB 25. Information relating to the corresponding complaint processing the system controller implemented utilizing the system controller terminal 17 described later on, is stored in the complaint processing DB 26. Information such as the number matching the complaint, the countermeasure taken in response to the complaint, results of the countermeasure, and the corresponding date and time are further stored in the complaint processing DB 26.

A system control terminal device 17 is a terminal device for processing complaints and for system processing of the service. The system control terminal device 17 for example, accesses the complaint DB 25 by way of the controller 16, searches for data regarding the complaint presented by the person participating in the service and, when a countermeasure has been implemented by processing performed by the system control terminal device 17 or by the controller, then that countermeasure and corresponding results are output to the complaint processing DB 26 by way of the controller 16 and stored. An accounting system interface 18 is connected to the accounting system 5 of FIG. 1, and exchanges data with the controller 16.

In the description below, when there is no particular need to separately distinguish the user terminal devices 2-1 through 2-n, then user terminal device 2 is used as a general name. When there is no particular need to separately distinguish the company terminal devices 3-1 through 3-m, then company terminal device 3 is used as a general name. When there is no particular need to separately distinguish the distribution company terminal devices 4-1 through 4-p, then distribution company terminal device 4 is used as a general name.

Figure 3:
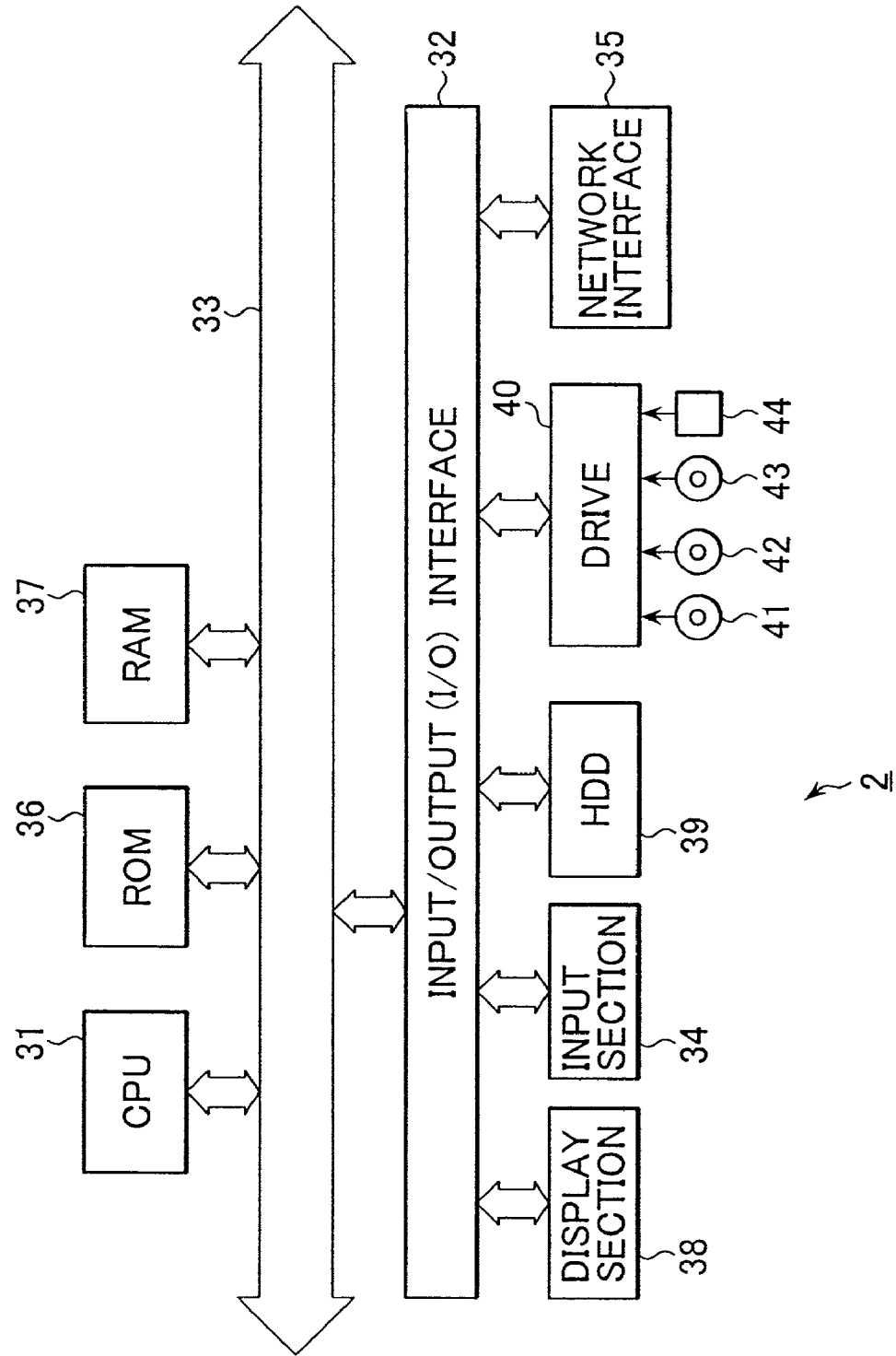
FIG. 3 is a block diagram showing the structure of the user terminal device.

A block diagram of the structure of the user terminal device 2 is shown in FIG. 3. The company terminal device 3, the distribution company terminal device 4 and the system control terminal device 17 basically have the same structure as the user terminal device 2 so an explanation is therefore omitted here.

A CPU (central processing unit) 31 receives signals input by way of the network interface 35 and signals corresponding to all types of commands input for example, by the user or operator by utilizing an input section 34, by way of an input/output interface 32 and an internal bus 33, and based on these respective signals, executes all types of processing. A ROM (read only memory) 36 stores basically fixed data from among programs (such as web browser software for viewing the web content opened to the public on the network 6, and client programs such as for conducting chat in the virtual space described below) and computation parameters used by the CPU 31. A RAM (random access memory) 37 stores programs run on the CPU 31 and parameters changed as needed during running of those programs. The CPU 31, ROM 36 and the RAM 37 are mutually connected by an internal bus 33.

The internal bus 33 is also connected with the input/output interface 32. The input section 34 may for example be a keyboard or a mouse, and is operated when inputting all types of commands to the CPU 31. A display section 38 consists for example of a CRT (cathode ray tube) and displays information of various types such as text or images. An HDD 39 drives a hard disk and records or reproduces programs used in the CPU 31, and data generated by the processing for those programs. A magnetic disk 41 or an optical disk 42, or a magneto-optical disk 43 or a semiconductor memory 44, are mounted in a drive 40 and data are exchanged. A network interface 35 is connected to a network 6 and for example exchanges information with a user server 11, etc.

In a state where the user terminal device 2 is accessing the multi-user server 12, and when the client program is loaded in the RAM 37 and started up, the CPU 31 receives input data corresponding to, for example, a virtual space such as the virtual space described below with reference to FIG. 9 sent from the multi-user server 12 by way of the network 6, and outputs that data for display on the display section 38. Then, while the user makes entries utilizing the input section 34 while referring to the display section 38, the CPU 31 receives input signals such as, for example showing movement of the avatar, or signals indicating the contents of speech emitted by the avatar of another user. The CPU 31 sends those signals to the multi-user server 12 by way of the internal bus 33, the input/output interface 32, the network interface 35 and the network 6.

Figure 4:
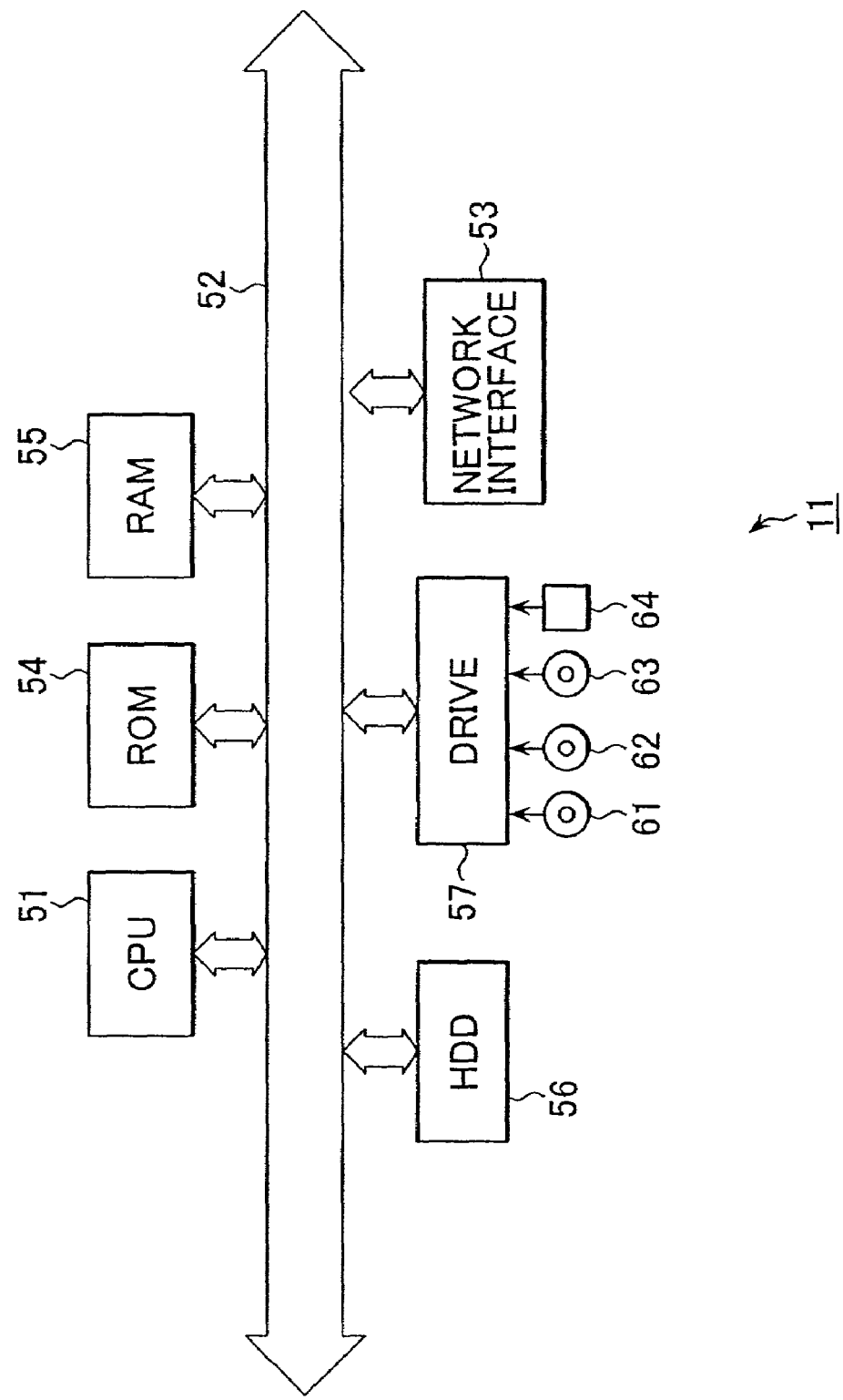
FIG. 4 is a block diagram showing the structure of the user server 11.

FIG. 4 is a block diagram showing the structure of the user server 11. The multi-user servers 12 through controller 16 also have basically the same structure as the user server 11 so an explanation is omitted here.

The CPU 51 receives the signals input from the user server device 2 by way of the network 6, the network interface 53, and the internal bus 52, and implements the processing based on these signals. The ROM 54 stores programs (for example, the programs described later on, to run processing for providing services such as electronic bulletin board {BBS} and mailing lists provided to the community members, programs to perform new user registration processing, new community registration processing, processing to search communities based on keywords that were entered) and basically fixed data from among computation parameters. The RAM 55 stores programs run on the CPU 51 and parameters that change as needed during running of those programs. The CPU 51, ROM 54 and the RAM 55 are mutually connected by an internal bus 52.

The internal bus 52 is also connected with the HDD 56, the driver 57 and the network interface 53. The HDD 56 drives a hard disk and records or reproduces programs used in the CPU 51, and data generated by the processing for those programs. A magnetic disk 61, or optical disk 62, or magneto-optical disk 63 or a semiconductor memory 64 are mounted in a drive 57 and data are exchanged. A network interface 53 is connected to the network 6 and exchanges information with, for example, a user terminal device 2, and exchanges information with a distribution company server 13, a company server 14, a controller 16, a user information DB 21 and a community information DB 22 by way of specified interface cables, and the like.

Figure 5:
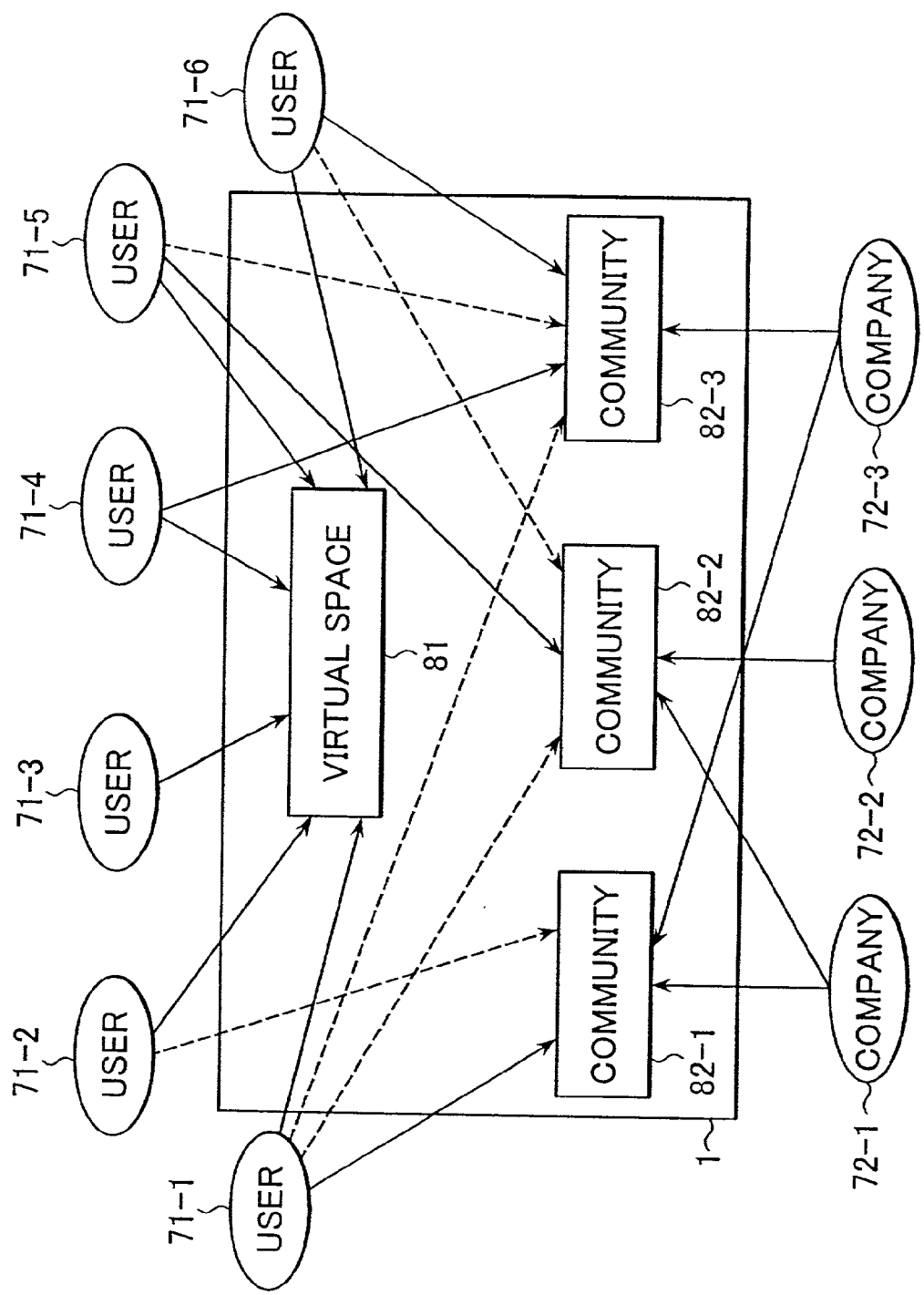
FIG. 5 is a drawing showing the virtual space and the community.
Figure 6:
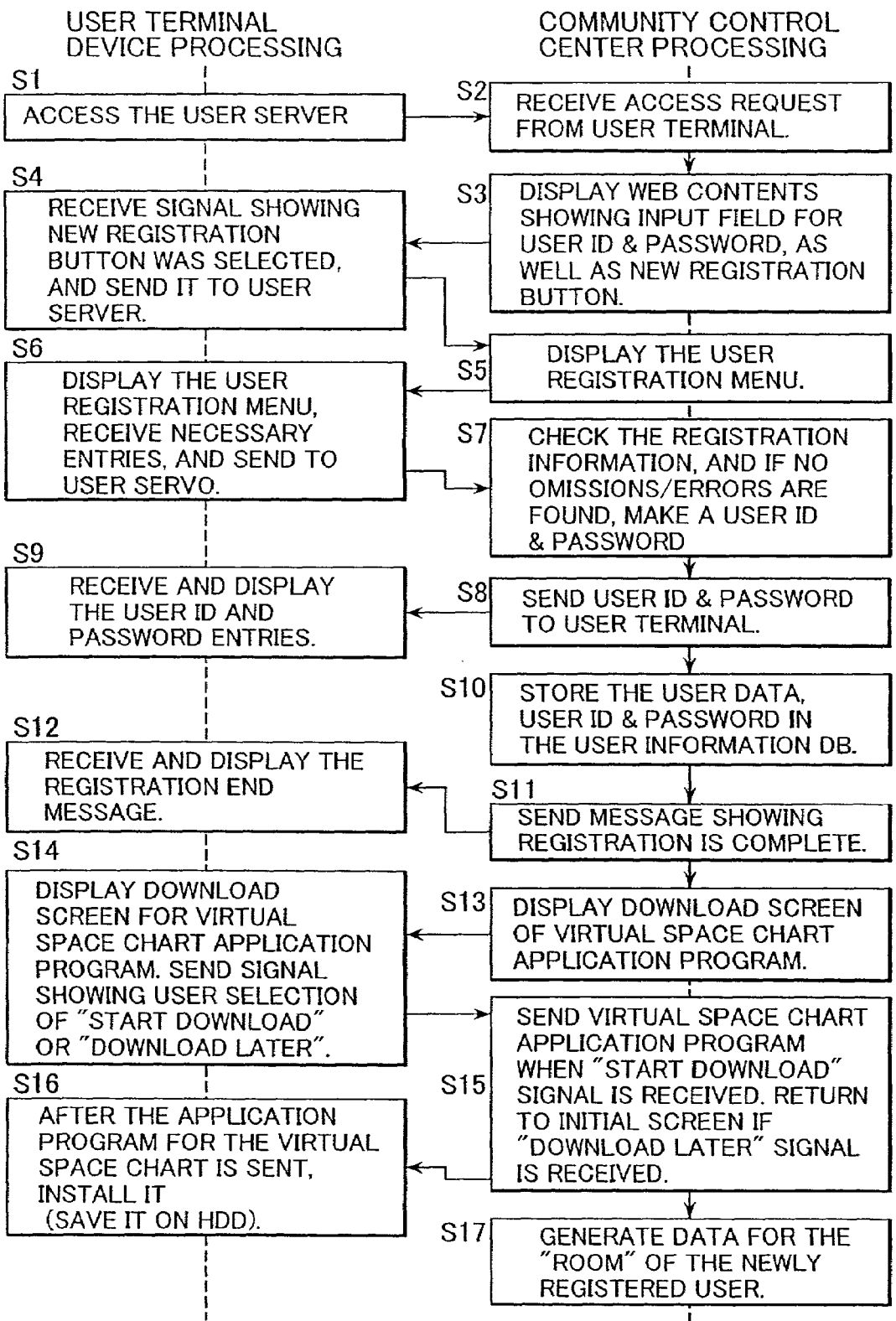
FIG. 6 is a flow chart for showing the process when the user participates in the service providing the community system.

The "virtual space" and the "community" of the service are next described while referring to FIG. 5.

The users, 71-1 through 71-6 respectively, use the user terminal device 2 according to the processing described later on in FIG. 6, to access the user server 11 of the community control center 1 via the network 6, and can register with the service by registering (entering) the required information. The users 71-1 through 71-6 registered with the service can access a virtual space 81.

Within the virtual space 81, a space is assigned to each of the users 71-1 through 71-6 indicating a "virtual room," and a space indicating a "town" for holding conversations (chats) between avatars just as if actually meeting a person, as related later on in FIG. 9. Avatars are assigned to each of the registered users 71-1 through 71-6 representing each of those users. The Avatars move and "chat" with avatars of other users. The "town" may, for example, be divided into particular themes according to the hobbies of the user and a plurality of such towns may be made available.

The users 71-1 through 71-6 registered with the service can create a new community or can participate in previously existing communities 82-1 through 82-3.

The community is a gathering of users sharing a common goal or having a common object of interest. Diverse types of communities can be formed such as a wine tasting club, class alumni, a place for exchanging preferred travel information, a collection of persons aiming to pass a particular qualifying test, or a gathering of fans of a particular game, etc. The management of the communities 82-1 through 82-3 may center around one or a plurality of owners.

In FIG. 5 for example, the user 71-1 is the owner of the community 82-1 and further a participant of the community 82-2 and community 82-3. In the same way, the user 71-2 is a participant in the community 82-2, the user 71-4 is an owner of the community 82-3, the user 71-5 is an owner of the community 82-2, and further a participant in the community 82-3, the user 71-6 is a participant in the community 82-2, and further an owner of the community 82-3.

The user 71-3 is not a participant in a community. The user can in this way participate in a number of particular desired communities. The community 82-1 and the community 82-2 are each managed by one owner, and the community 82-3 is managed by two owners.

The users participating in the communities 82-1 through 82-3 possess community cards within the virtual space 81 showing them to be participants in the corresponding communities.

These communities 82-1 through 82-3 possess for example, attributes such as a community name, an object of community interest, the number of members, average member age, member age distribution, ratio of male to female members, list of members, names of owners, rankings of member individual keywords, and keywords expressing the community.

The attributes of the communities 82-1 through 82-3 described using FIG. 2 are registered (stored) in the community information DB 22.

The company 72-1 through company 72-3 provide services to the users 71-1 through 7115-6 by way of the community 82-1 through community 82-3. The company 72-1 through company 72-3 can only provide services to a community for which access is permitted. In FIG. 5 for example, the company 72-1 is allowed access rights to provide services to the community 82-1 and community 82-2, the company 72-2 is allowed access rights to provide services to the community 82-2, the company 72-3 is allowed access rights to provide services to the community 82-1 and community 82-3. The company 72-1 through company 72-3 can view a portion of the community attribute information allowed by the respective owners of the communities 82-1 through 82-3; however they cannot know the individual information of the users 71-1 through 71-6 participating in the community 82-1 through community 82-3.

When there is no particular need to separately distinguish the users 71-1 through 71-6, then user 71 is used as a general name. When there is no particular need to separately distinguish the company 72-1 through 72-3, then company 72 is used as a general name. When there is no particular need to separately distinguish the community 82-1 through 82-3, then community 82 is used as a general name.

An example of the services the community 82 grants to the user 71 are described next.

A user 71 that is a participating member of the community 82 may receive BBS and mailing list services run by the community 82. Here, BBS is not a one-to-one party communication means such as electronic mail but a system allowing information transmission of one-to-many parties, and since the structure resembles an electronic display panel is referred to as a bulletin board system (in other words BBS). When a person who is a member of the community 82 writes a message on the BBS, all members with access to the BBS can view that message, and the members reading that message can further write a reply on the bulletin board (that message is also revealed to other members) and replies can be made addressed to individual members by electronic mail.

A mailing list is a service similar to an electronic bulletin board system concentrating on a host such as a personal computer, and diffused over a network environment, so that electronic mail sent to a specific mail address is sent to all participating members.

In another service, participants can enjoy a simulated conversation with each other in real-time, or in other words a so-called chat service. According to this service, a plurality of users 71 are simultaneously accessing web contents available only to members of a specific community 82. The message of a particular user 71, or in other words, the writing by a user 71 onto the web contents by using the input section 34, is sent to the user server 11 over the network 6. All of these messages are input over the network 6 to all user terminal devices 2 accessing the corresponding web contents and are shown on the display section 38 of the user terminal devices.

Rights and functions such as the right to allow new member participation, the function to collect voting statistics from members, the function to display schedules, rights to forcibly leave the community, rights to forcibly erase information written on the BBS, rights to set limits on access to the community by the company 72, and rights to set limits on exchange of community cards, may be granted to the owner of the community 82 so that management of the community 82 proceeds smoothly.

The registration processing required of the user for participating in the virtual space 81 of the service and in the community 82 is described next utilizing FIG. 5 and referring to the flowchart of FIG. 6.

In step S1, the CPU 31 of the user terminal device 2 accesses the user server 11 by way of the internal bus 33, the input/output interface 32, the network interface 35 and the network 6.

In step S2, the CPU 51 of the user server 11 accepts an accessing request from the user terminal device 2. In step S3, web content displaying the input field for the user ID and password and also the new registration button, are sent to the user terminal device 2 by way of the internal bus 52, the network interface 53 and the network 6, and shown on the display section 38 of the user terminal device 2.

In step S4, the CPU 31 of the user terminal device 2 receives the input signal showing selection of the new registration button displayed in step S3, from the input section 34 by way of the input/output interface 32 and internal bus 33. The CPU 31 sends the signal to the user server 11 by way of the internal bus 33, the input/output interface 32, the network interface 35 and the network 6.

In step S5, the CPU 51 of the user server 11 sends the web content shown on the user registration menu to the user terminal device 2 by way of the internal bus 52, network interface 53, and the network 6, and shows the web content on the display section 38 of the user terminal device 2.

In step S6, the CPU 31 of user terminal device 2, displays the user registration menu on the display section 38, receives the signal input showing the registration contents input by the user 71 using the input section 34 by way of the input/output interface 32 and internal bus 33, and sends the signal to the user server 11 by way of the internal bus 33, the input/output interface 32, the network interface 35 and the network 6.

In step S7, the CPU 51 of the user server 11 verifies the registration contents sent from the user terminal device 2, and if there are no entry omissions, makes a user ID and password for that user and in step S8 sends the user ID and password to the user terminal device 2 by way of the internal bus 52, the network interface 53 and the network 6.

In step S9, the CPU 31 of user terminal device 2, receives the user ID and password input, and outputs the user ID and password by way of the internal bus 33 and the input/output interface 32 for display on the display section 38.

In step S10, the CPU 51 of the user server 11, outputs and stores (registers) the registration contents (in other words, the user information) input in step S7, and also the user ID and password input in step S7 to the user information DB 21 by way of the internal bus 52 and the network interface 53.

In step S11, the CPU 51 of the user server 11 sends a message showing that registration is complete to the user terminal device 2 by way of the internal bus 52, the network interface 53 and the network 6.

In step S12, the CPU 31 of user terminal device 2 receives the input message showing that registration is complete, and displays the message on the display section 38 by way of the input bus 33 and the input/output interface 32.

In step S13, the CPU 51 of the user server 11 sends a download screen of the application program for the virtual space chat for display on the display section 38 of the user terminal device 2 by way of the internal bus 52, the network interface 53 and the network 6.

In step S14, the CPU 31 of user terminal device 2 receives the input download screen of the application program for the virtual space chat, and outputs the download screen for display on the display section 38 by way of the internal bus 33 and the input/output interface 32. A signal selected by the user from either "Start download" or "Download later" input by the user while referring to the display screen shown on the display section 38 is received, and sent to the user server 11 by way of the internal bus 33, the input/output interface 32, the network interface 35 and the network 6.

In step S15, when a signal was input showing "Start download" is selected, the CPU 51 of the user server 11 sends the application program for the virtual space chat to the user terminal device 2 by way of the internal bus 52, the network interface 53 and the network 6. When a signal was input showing "Download later" was selected, the CPU 51 sends the initial screen to the user terminal device 2 by way of the internal bus 52, the network interface 53 and the network 6.

In step S16, when the application program for the virtual space chat sent in step S15 arrives from the user server 11, the CPU 31 of user terminal device 2, installs that program, or in other words stores the program in the HDD 39 by way of the internal bus 33 and the input/output interface 32.

Figure 7:
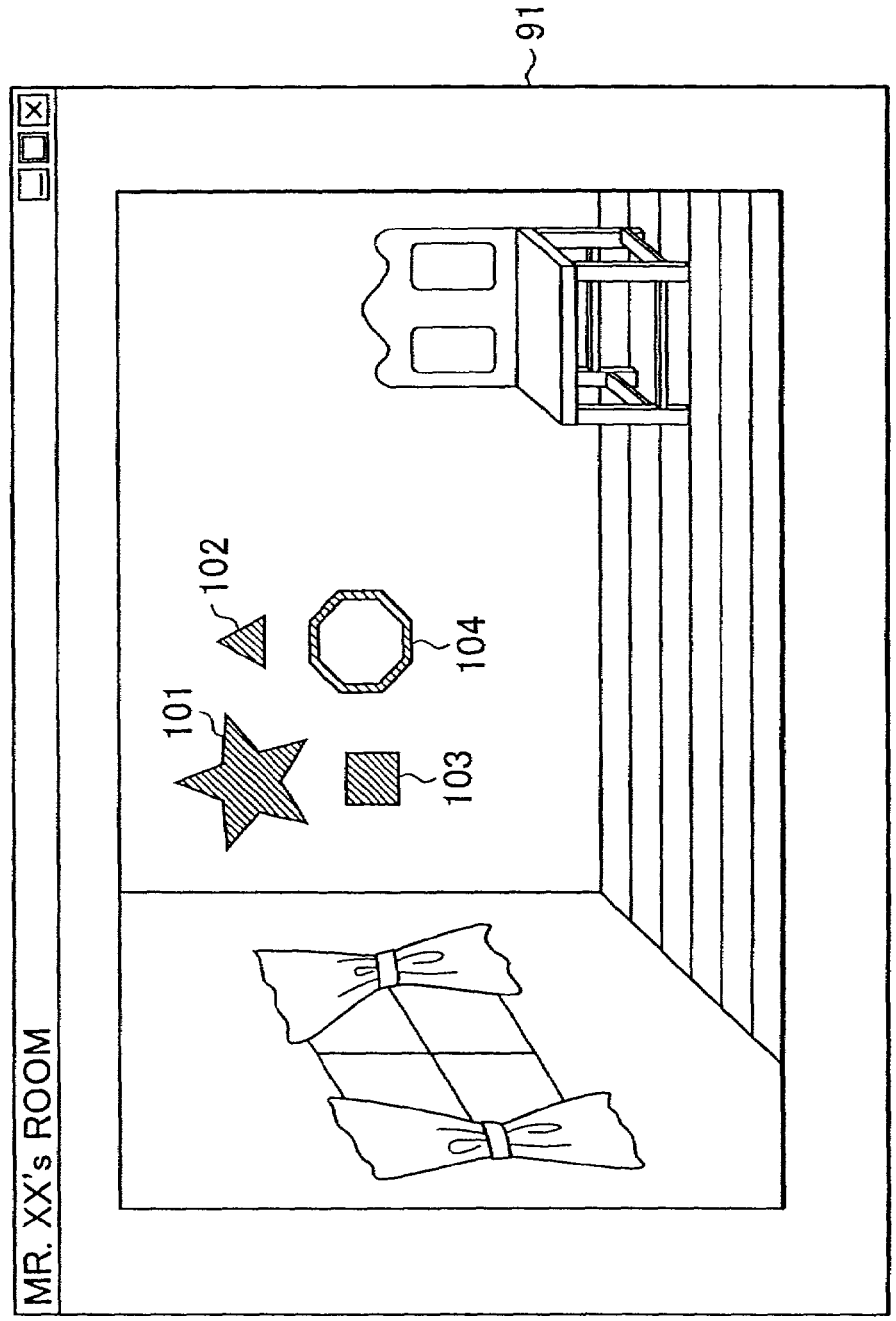
FIG. 7 is a drawing showing the user's "room" made inside the virtual space and the displayed community symbols.

In step S17, the CPU 51 of the user server 11 generates a control signal for making data corresponding to the "room" of the newly registered user, and sends this signal to the multi-user server 12 by way of the internal bus 52 and the network interface 53. The multi-user server 12 creates and stores data corresponding to the "room" of the user 71 as shown in FIG. 7, and the processing ends.

Rooms for the respective users 71 are prepared in the virtual space 81 provided by the service as previously described. The "room" of the user 71 is described with reference to FIG. 7. The user 71 registered in the service according to the processing described using FIG. 6, can have access to a virtual space 81 showing the user's own "room" as for example shown in FIG. 7, by accessing the multi-user server 12. A symbol 101 and a symbol 104 (or the community card itself is sufficient) of the community 82 where the participating user 71 possesses a room, are shown on the "room" of the display screen 91.

These symbols 101 and 104 may be displayed as 3D (three-dimensional) objects, or may be displayed as a bit map. The symbol 104 for a community 82 where the user is the owner can be displayed with a shining light to distinguish the symbol 104 from the other symbols 101 through 103. Further, the size of these symbols can be decided by the number of participating members in the community 82, and the greater the number of participating members in a large scale community 82, the larger the symbol that can be displayed. In FIG. 7 for example, the symbol 101 showing the community 82 can be clearly seen to be on a larger scale than the other symbols 102 through 104 showing the community 82.

A plurality of communities 82 are managed by the service, however, by displaying the symbols 101 through 104 showing the community 82, on the display screen 91 that shows the room for the user 71, the scale of the respective community 82, and whether one is the owner or is a participant can be seen at a glance. Therefore, the user 71 can himself manage a plurality of communities 82 or may participate in a plurality of communities 82 without any confusion, and can enjoy the activities of the virtual space 81 in the plurality of communities 82.

In the above processing, the user 71 registered in the service can utilize the virtual space 81 provided by the service, and can possess his own "room" within the virtual space 81.

The user 71 registered in the service can become a new member and participate in a previously existing community described using FIG. 5. A number of methods are available for acquiring a community card showing membership in the community 82.

The user 71 for example, can use a keyword matching his own hobbies and interests, to search a corresponding community 82 for web contents prepared on the user server 11. The user 71 accesses the user server 11 by utilizing the user terminal device 2, and inputs the keyword while referring to the search screen. Based on the keyword entered via the network 6, the user server 11 searches the applicable community 82 from the community information DB 22, and displays the web contents.

The user 71 contacts the owner of a specific desired community 82 from among the searched communities 82 with an application to participate, obtains the consent of the owner and receives a community card. The method for contacting the owner of the applicable community 82 may for example be electronic mail or preparation of an application entry form on the web contents showing the search results. The user 71 enters the specified information such as his own user ID and handle name, and then contacts the owner of the applicable community 82 by pressing the send button provided on the entry form to transmit the participation application. Further, if there are no restrictions on member registration in the applicable community 82, then a community card may be issued without the intervention of the owner.

Information relating to registration of a new member in these communities 82 is sent from the user server 11 or the multi-user server 12 to the controller 16. Based on the input signal, the controller 16 rewrites the corresponding information in the user information DB 21 and the community information DB 22. A member of the community 82 possesses a community card within the virtual space 81 showing membership in the applicable community 82.

In this service, in the virtual space 81, the users 71 (including owners) participating in the community 82, can directly exchange community cards with users 71 not participating in the community. The user 71 in the virtual space 81 by carrying out an actual chat, can for example question members actually participating in the community 82 about the conditions of the community 82, and can in this way search for a community 82 that matches his own interests and preferences. Participation in one's own community 82 can also be recommended to other users 71.

The processing for directly exchanging (giving and receiving) community cards in the virtual space 81 is described next while referring to the flowchart of FIG. 8.

In step S21, the CPU 31 of the user terminal device 2-1 accesses the user server 11 by way of the internal bus 33, the input/output interface 32, the network interface 35 and the network 6. The user ID and password are entered on the user ID and password input field sent from the user server 11 and shown on the display section 38. A user 71 utilizing the user terminal device 2-1 is treated here as user A.

In step S22, the CPU 31 of the user terminal device 2-2, executes the same processing as in step S21. A user 71 utilizing the user terminal device 2-2 is treated here as user B.

In step S23, the CPU 51 of the user server 11 accepts accessing from the user terminal device 2 and sends the entered user ID and password to the verification server 15 by way of the internal bus 52 and the network interface 53. In step S24, the verification server 15 of CPU 51 (FIG. 4 is referred to here not only for the user server 11, but also for showing the structure of the multi-user server 12 through controller 16) executes the verification processing of the user A and the user B based on the user ID and password that were input.

In step S25, the CPU 31 of the user terminal device 2-1 sends the multi-user server 12 address transmit request to the user server 11 by way of the internal bus 33, the input/output interface 32, the network interface 35, and the network 6.

In step S27, the CPU 51 of the user server 11 accepts input of the multi-user server 12 address transmit request and sends by way of the internal bus 52, the network interface 53, and the network 6, the address of the multi-user server 12 to the user terminal device 2 that sent the multi-user server 12 address transmit request.

In step S28, based on the address sent from the user server 11, the CPU 31 of the user terminal device 2-1 accesses the multi-user server 12 by way of the internal bus 33, the input/output interface 32, the network interface 35, and the network 6.

In step S30, the CPU 51 of the multi-user server 12 sends the input user ID and password to the verification server 15 by way of the internal bus 52 and the network interface 53. In step S33, the CPU 51 of the verification server 15 executes verification processing based on the entered user ID and password.

In step S31, the CPU 31 of the user terminal device 2-1 starts up and loads the client program stored in the ROM 36 or the HDD 39 into the RAM 37.

The CPU 31 of the user terminal device 2-2 performs the same processing in step S26, step S29, and step S32, that were executed by the CPU 31 of the user terminal device 2-1 in step S25, step S28 and step S31.

The user A and the user B can access the virtual space 81 provided by the multi-user server 12 by means of the processing of step S21 through step S33 as described in FIG. 5. By accessing the virtual space 81 provided by the multi-user server 12, a display screen 111 is displayed on the display section 38 as shown in FIG. 9. The display screen 111 of the user terminal device 2 has a virtual space 81 comprised for example, of a virtual space display section 121 for displaying 3D (three-dimensional) objects, and a possession list window 122 for displaying the community cards 141 through 143 of the community 82 that one is participating in. The user A and the user B can move freely within the virtual space 81 by operating the input section 34 of the user terminal device 2 while referring to the virtual space display section 121.

The display screen 111 of FIG. 9 is shown here on the display section 38 of the user terminal device 2-1. When the user A encounters the avatar 131 indicating that the user B is in the virtual space 81 (when the avatar 131 indicating the user B as shown in FIG. 9, is displayed on the virtual space display section 121), the avatar 131 indicating the user A is displayed on the display screen 111 (not shown in the drawing) and shown on the display section 38 of the user terminal device 2-2 possessed by the user B.

The mutually emitted messages from the user A and the user B are input by using the input section 34, and respectively sent to the multi-user server 12 from the user terminal devices 2-1 and 2-2 by way of the network 6. The multi-user server 12 sends the conversation data sent from the user terminal devices 2-2 to the user terminal devices 2-1 by way of the network 6, and for example, a so-called "dialog bubble" from the avatar 131 is shown on the display screen 111, the message contents displayed, a text display box appears, and the speech data sent from the user terminal devices 2-1 and 2-2 are displayed. A chat can be achieved in the so-called virtual space 81 by also displaying the speech contents of the user A and the user B in the same way on the user terminal device 2-2. The example related here described a chat using text, however, a so-called voice chat may be achieved by sending voice data rather than text data to the multi-user server 12.

Then, if the user A makes a request, for example, to the user B by means of a conversation with user B in the virtual space 81, or if the user A invites the user B to participate in the community 82 that user A belongs to, then in step S34, the CPU 31 of the user terminal device 2-1 accepts the input of an operation of the input section 34 to deliver a community card to the user B by way of the input/output interface 32 and the network interface 35, and the CPU 31 sends it to the multi-user server 12 by way of the internal bus 33, the input/output interface 32, the network interface 35 and the network 6.

The operation implemented by the user A to deliver a community card to the user B, may for example constitute selecting a community card corresponding to any one of the community cards 141 through 143 by using a mouse, to drag-and-drop the icon representing the community card onto the avatar showing user B, or the operation may constitute selecting a community card corresponding to any one of the community cards 141 through 143 so that for example a dialog box is displayed, and a button appears in that dialog box for selecting an operation such as "Deliver community card".

In the exchanging (giving and receiving) of community cards, the method for handling the community card can be set beforehand by setting the attributes of the respective community card. When the community card 141 for example has an attribute allowing copying, then by user A delivering the community card 141 to the user B, the user B obtains possession of the community card 141 and further the user A can still retain possession of the community card 141.

Further, when the community card 142 has an attribute that prohibits copying, then by delivery of the community card 141 by the user A to the user B, the user B obtains possession of the community card 141; however the user A loses possession of the community card 141 due to that operation. The number of users of the corresponding community 82 can in this way be maintained at a fixed number.

Also, when the community card 143 has an attribute that only allows distribution by the owner, then when the user A is the owner, the user A can copy a community card to give to the user B. However if the user A is not the owner, then the user A cannot give the community card to the user B. In such cases, the owner of the corresponding community 82 can have a complete grasp of the members participating in the community 82.

The attributes of these community cards 141 through 143 can be set in advance by the owner of the corresponding community 82.

In step S35, the CPU 51 of multi-user server 12 determines whether the exchanging (giving/receiving) of the community card that user A is attempting to implement is allowable from the attributes of the corresponding card based on the signal showing the operation for transferring the community card of user A input from the user terminal device 2-1 by way of the network 6, the network interface 53 and the internal bus 52. When it is determined that transferring of the community card is not allowable, the CPU 51 of multi-user server 12 may send a message to the user terminal device 2-1 by way of the internal bus 52, the network interface 53 and the network 6 indicating that transfer of the community card is not allowable.

In step S36, the CPU 51 of multi-user server 12 sends data for displaying a popup window for verifying that the community card has been received. This data is sent to the user terminal device 2-2 utilized by user B by way of the internal bus 52, the network interface 53 and the network 6.

In step S37, the CPU 31 of user terminal device 2-2 displays the data corresponding to the popup window input by way of the internal bus 33 and the input/output interface 32 on the display section 38. A signal input by the user B utilizing the input section 34 is received, showing that "OK" was selected for the message on the popup window and is sent to the multi-user server 12 by way of the internal bus 33, the input/output interface 32, the network interface 35 and the network 6.

In step S38, the multi-user server 12 receives a signal from the user terminal device 2-2 showing that "OK" was selected. The corresponding data for the user information DB 21 and the community information DB 22 are rewritten, and the processing ends.

In the processing described above, the user participating in the service can himself manage as the owner, the plurality of communities 82 matching his own interests and objectives, and can participate in a plurality of already existing communities 82. The user of the service may also possesses a community card for the community 82 that the user himself is participating in, and can exchange community cards with other users in the virtual space 81 by a simple operation, in compliance with the attributes of the community cards set by the owner of the community 82.

The above series of processing steps may also be implemented by software. The program comprising this software may be installed in dedicated hardware incorporated into a computer or may be installed as programs of various types, and may be installed from a recording medium such as a general purpose personal computer capable of implementing functions of various types.

This recording medium may be a packaged medium distributed to the user as programs as shown in FIG. 3 and FIG. 4, recorded on a magnetic disk 41, and 61 (including floppy disk), an optical disk 42 and 62 (including CD-ROM {Compact Disk-Read Only Memory}), a DVD {Digital Versatile Disk}), and a magneto-optical disk 43 and 63 (including MD{Mini-disk}) or semiconductor memories 44 and 64, etc.

In this specification, the steps describing the computer program are listed in the order that the processing is performed on a time base. Of course these steps need not always be performed on a time base, and the processing may include methods such as performing the steps separately or in parallel. The term, "system" as used in this specification refers to the overall device composed of a plurality of devices.

What is claimed is:

1. An information processing apparatus for exchanging information with other information processing apparatuses over a network, said apparatus comprising:

first record control means for controlling the recording of information relating to at least one community composed of a plurality of users;

second record control means for controlling the recording of information relating to said plurality of users;

first generation means for generating a first set of information corresponding to a virtual space capable of being utilized by said plurality of users using said other information processing apparatuses;

second generation means for generating a second set of information including an information list showing said community a first user participates in from information relating to said plurality of users;

a display which displays at least a portion of the virtual space and said information list;

first output control mean, for controlling the output to said other information processing apparatuses, of said first set of information generated by said first generation means, and said second set of information generated by said second generation means, and an input control means for controlling the input front said other information processing apparatuses, of a fourth set of information showing the operation by said first user for giving a third set of information showing a specified community to a second user, from among the second set of information generated by said second generation means, within said virtual space generated by said first generation means, wherein the third set of information is represented by an icon, where the first user can deliver the third set of information to said second user by dragging and dropping the icon onto a representation of said second user, within the virtual space, wherein said first record control means controls the recording of information relating to said community shown by said third set of information, on the basis of said fourth set of information with inputs controlled by said input control means, and wherein said second record control means controls the recording of information relating to said first user and said second user, on the basis of said fourth set of information with inputs controlled by said input control means.

2. The information processing apparatus according to claim 1, wherein in the virtual space, when said first user has given said third set of information to said second user, both said first user and said second user can become members of the community shown in the third set of information.

3. The information processing apparatus according to claim 1, wherein when said first user is a controller of said community shown with said third set of information, said first user can make said second user a member of the community by giving said second user said third set of information within the virtual space.

4. The information processing apparatus according to claim 1, wherein when said first user has given said third set of information to said second user in the virtual space, said first user loses said third set of information, and is no longer a community member shown in said third set of information, and said second user receives said third set of information and becomes a community member shown in said third set of information.

5. The information processing apparatus according to claim 1, further comprising third generation means to generate for each user, a fifth set of information available to an individual user and corresponding to a virtual space for exclusive use by the individual user;

second output control means for controlling output of said fifth set of information generated by said third generation means, to said other information processing apparatuses;

wherein said second set of information is contained in said fifth set of information generated by said third generation means.

6. The information processing apparatus according to claim 5, wherein said second set of information is image information corresponding to said community, and can be displayed on other information processing apparatuses within said exclusive user virtual space output by the second output control means.

7. The information processing apparatus according to claim 6, wherein the size of said image information changes according to the number of members participating in the corresponding community.

8. The information processing apparatus according to claim 6, wherein when said individual user is the owner of specified said community, said image information corresponding to specified said community is displayed separately for distinguishing said image information from said image information corresponding to other said communities.

9. An information processing method for an information processing apparatus for exchanging information with other information processing apparatuses over a network, said method comprising:

recording information relating to at least one community composed of a plurality of users;

recording information relating to said plurality of users of said community;

generating a first set of information corresponding to a virtual space utilizable by a plurality of said users using other said information processing apparatuses;

generating a second set of information including a table showing said community participated in by a first user of said plurality of users;

displaying at least a portion of the virtual space and said table on a display;

controlling an output to said other information processing apparatuses, of said first set of information and said second set of information controlling the input from said other information processing apparatuses, of a fourth set of information showing the operation by said first user for giving a third set of information showing a specified community to a second user, from among said second set of information generated by said second generation means, within said virtual space, controlling the recording of information relating to said community shown by said third set of information, on the basis of said fourth set of information with inputs controlled by said input control means, wherein the third set of information is represented by an icon, where the first user can deliver the third set of information to said second user by dragging and dropping the icon onto a representation associated with said second user within the virtual space, and, controlling the recording of information relating to said first user and said second user, on the basis of said fourth set of information with inputs controlled by the processing in said input control step.

10. An information processing computer program for exchanging information with other information processing apparatuses over a network, said computer program comprising:

a first recording control step for controlling the recording of information relating to at least one community composed of a plurality of users;

a second recording control step for controlling the recording of information relating to said plurality of users in said community;

a first generation step for generating a first set of information corresponding to a virtual space utilizable by a plurality of said users using other said information processing apparatuses;

a second generation step for generating a second set of information including information on a table showing said community participated in by said first user, from information relating to said plurality of said users;

displaying at least a portion of the virtual space and said table on a display;

an output control step for controlling an output to said other information processing apparatuses, of said first set of information generated by processing in said first generation step, and said second set of information generated by processing in said second generation step; and an input control step for controlling an input from said other information processing apparatuses, of a fourth set of information showing the operation by a said first user for giving a third set of information showing a specified community to a second user, from among said second set of information generated by said second generation means, within said virtual space generated by the processing in said first generation step; wherein said first recording control step controls the recording of information relating to said community shown by said third set of information, on the basis of said fourth set of information with inputs controlled by said input control means, wherein the third set of information is represented by an icon, where the first user can deliver the third set of information to said second user by dragging and dropping the icon onto said second user within the virtual space, and wherein said second recording control step controls the recording of information relating to said first user and said second user, on the basis of said fourth set of information with inputs controlled by the processing in said input control step.

11. A service providing system which comprises a first information processing apparatus for exchanging information with other information processing apparatuses over a network, and a second information processing apparatus possessed by a user, said first information processing apparatus comprising:

first record control means for controlling the recording of information relating to a community composed of a plurality of users;

second record control means for controlling the recording of information relating to said plurality of users in said community;

first generation means for generating a first set of information corresponding to a virtual space capable of being utilized by said plurality of users using said other information processing apparatuses;

second generation means for generating a second set of information including a list showing said community a first user participates in, from information relating to said plurality of users;

first output control means for controlling output to said second set of information processing apparatus, of said first set of information generated from said first generation means, and said second set of information generated by said second generation means;

first input control means for controlling an input from said second set of information processing apparatus, of a fourth set of information showing the operation by said first user for giving a third set of information showing a specified community to a second user, from among a second set of information generated by said second generation means, within said virtual space generated by said first generation means;

wherein the third set of information is represented by an icon, where the first user can deliver the third set of information to said second user by dragging and dropping the icon onto said second user within the virtual space, wherein said first record control means controls the recording of information relating to said community shown by said third set of information, on the basis of said fourth set of information with inputs controlled by said first input control means, and said second record control means controls the recording of information relating, to said first user and said second user, on the basis of said fourth set of information with inputs controlled by said first input control means, and said second information processing apparatus comprising:

second input control means for controlling the input of said first set of information and said second set of information with outputs controlled by said first output control means;

display control means for controlling the display of at least a portion of the virtual space, said first set of information and said second set of information with outputs controlled by said second input control means;

third input control means for controlling the input of said fourth set of information showing the operation for supplying to said second user said third set of information showing a specified community from among said second set of information within said virtual space showing said first set of information, and said third set of information was supplied by said first user after referring to said first set of information and said second set of information whose display is controlled by said display control means; and second output control means for controlling the output to said first set of information processing apparatus, of said fourth set of information with inputs controlled by said third input control means.

12. An information processing apparatus for exchanging information with other information processing apparatuses over a network, said apparatus comprising:

a first recorder that records information relating to at least on community composed of a plurality of users;

a second recorder that records information for each of said plurality of users;

a first information generator that generates a first set of information corresponding to a virtual space, wherein the virtual space is capable of being utilized by said plurality of users using said other information processing apparatuses;

a second information generator that generates a second set of information including an information list showing said community a first user participates in based on said information relating to each of said plurality of users, wherein each of said communities on said information list are represented by an image;

a display screen that displays at least a portion of said virtual world and said information list;

an output controller for controlling the output of said first set of information, and said second set of information to the other information processing apparatuses; and an input controller for controlling the communication of a third set of information regarding a specific community on said information list from said first user to a second user within said virtual space, wherein the third set of information is represented by an icon, where the first user can deliver the third set of information to said second user by dragging and dropping the icon onto said second user within the virtual space, wherein said first recorder controls the recording of said third set of information; and said second recorder controls the recording of information relating to said first user and said second user;

and wherein said first user uses said input controller to move the image of said specific community from said information list to said second user within said virtual space on said display screen.

13. The information processing apparatus of claim 12, wherein when the first user communicates the third set of information to the second user, both said first user and said second user are eligible to become members of the community in the third set of information.

14. The information processing apparatus of claim 12, wherein when the first user owns the specific community of said third set of information, said first user can make said second user a member of the specific community by communicating said third set of information within the virtual space to the second user.

15. The information processing apparatus of claim 14, wherein the communication of the third set of information from the first user to the second user includes clicking on and dragging the third set of information displayed by the display screen to a representation of the second user in the virtual space.

16. The information processing apparatus of claim 15, wherein the representation of the second user includes an avatar.

17. The information processing apparatus according to claim 12, wherein when the first user has communicated the third set of information to the second user in the virtual space,
   said first user loses said third set of information, and is no longer a member of the community defined by said third set of information, and
   said second user receives said third set of information and becomes a member of the community member defined by said third set of information.

18. The information processing apparatus according to claim 12, further comprising:
   a third information generator which generates for each user, a fifth set of information available to at least one individual user of the plurality of users and corresponding to an exclusive virtual space for exclusive use by the individual user; and
   a second output controller for controlling output of said fifth set of information to said other information processing apparatuses,
   wherein said second set of information is contained in said fifth set of information.

19. The information processing apparatus according to claim 18, wherein said second set of information includes image information regarding said community, and is displayable on other information processing apparatuses within the exclusive virtual space output by the second output controller.

20. The information processing apparatus according to claim 19, wherein the size of said image information changes according to the number of members participating in the corresponding community.

21. The information processing apparatus according to claim 19, wherein when said individual user is the owner of specified said community, said image information corresponding to specified said community is displayed separately for distinguishing said image information of said community from image information corresponding to other communities.

* * * * *